United States Patent
Qi et al.

(10) Patent No.: US 9,186,654 B2
(45) Date of Patent: Nov. 17, 2015

(54) LOW COST LEAN $NO_x$ REDUCTION CATALYST SYSTEM

(75) Inventors: Gongshin Qi, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 13/288,215

(22) Filed: Nov. 3, 2011

(65) Prior Publication Data

US 2013/0111876 A1 May 9, 2013

(51) Int. Cl.
*F01N 3/00* (2006.01)
*F01N 3/02* (2006.01)
(Continued)

(52) U.S. Cl.
CPC ............ *B01J 23/83* (2013.01); *B01D 53/9422* (2013.01); *B01D 53/9477* (2013.01); *B01J 23/002* (2013.01); *B01J 23/02* (2013.01); *B01J 23/10* (2013.01); *B01J 23/34* (2013.01); *B01J 23/63* (2013.01); *B01J 29/061* (2013.01); *B01J 29/85* (2013.01); *B01J 35/006* (2013.01); *B01J 35/0006* (2013.01); *B01J 35/0013* (2013.01); *B01J 35/04* (2013.01); *B01J 37/0018* (2013.01); *B01J 37/0036* (2013.01); *B01J 37/0201* (2013.01); *B01J 37/024* (2013.01); *B01J 37/0244* (2013.01); *B01J 37/0246* (2013.01); *B01J 37/038* (2013.01); *B01J 37/04* (2013.01); *B01J 37/088* (2013.01); *F01N 3/0814* (2013.01); *F01N 3/0842* (2013.01);
(Continued)

(58) Field of Classification Search
USPC ............ 60/286, 299–301; 422/171, 176, 180; 502/303, 325, 340, 345
See application file for complete search history.

(56) References Cited

U.S. PATENT DOCUMENTS 4,996,180 A 2/1991 Diwell et al.
5,063,193 A 11/1991 Bedford et al.
(Continued)

FOREIGN PATENT DOCUMENTS

DE 102010011406 A1 1/2011
DE 102012209204 A1 12/2012

OTHER PUBLICATIONS

A study on the structural properties and the storage mechanism of the rare earth perovskite catalyst La1-xSrxCo1-yFey03NSR.

*Primary Examiner* — Kenneth Bomberg
*Assistant Examiner* — Dapinder Singh
(74) *Attorney, Agent, or Firm* — Reising Ethington P.C.

(57) ABSTRACT

An exhaust aftertreatment system that includes a suitable combination of particulate catalyst materials is used to effectively reduce an amount of $NO_x$ to $N_2$ and water in a high-oxygen content exhaust flow from an engine that is controlled to operate by cyclically burning lean and rich mixtures of air and fuel. The catalyst materials of the exhaust aftertreatment system comprise (1) lanthanum-based perovskite oxide particles to oxidize NO to $NO_2$, (2) barium oxide particles to temporarily store $NO_2$, (3) copper oxide nanoparticles chemically deposited onto particles of cerium oxides to reduce $NO_x$ to $N_2$ and to generate $NH_3$, and (4) particles of a selective reduction catalyst to temporarily store $NH_3$ and to reduce any residual $NO_x$ to $N_2$ and water before the exhaust flow from the engine is discharged to the atmosphere.

17 Claims, 3 Drawing Sheets

(51) Int. Cl.

| | | |
|---|---|---|
| *F01N 3/10* | (2006.01) | |
| *F01N 3/20* | (2006.01) | |
| *B01J 23/83* | (2006.01) | |
| *F01N 3/08* | (2006.01) | |
| *B01J 37/02* | (2006.01) | |
| *B01J 37/03* | (2006.01) | |
| *B01J 37/04* | (2006.01) | |
| *B01J 37/08* | (2006.01) | |
| *B01J 35/00* | (2006.01) | |
| *B01J 23/00* | (2006.01) | |
| *B01J 23/02* | (2006.01) | |
| *B01J 23/10* | (2006.01) | |
| *B01J 23/34* | (2006.01) | |
| *B01J 23/63* | (2006.01) | |
| *B01J 29/06* | (2006.01) | |
| *B01J 29/85* | (2006.01) | |
| *B01J 35/04* | (2006.01) | |
| *B01J 37/00* | (2006.01) | |
| *F01N 13/00* | (2010.01) | |
| *B01D 53/94* | (2006.01) | |

(52) U.S. Cl.
CPC ........... *F01N 3/2073* (2013.01); *F01N 13/009* (2014.06); *B01D 53/9418* (2013.01); *B01D 2255/2042* (2013.01); *B01D 2255/2063* (2013.01); *B01D 2255/2065* (2013.01); *B01D 2255/20738* (2013.01); *B01D 2255/20761* (2013.01); *B01D 2255/402* (2013.01); *B01D 2255/50* (2013.01); *B01D 2258/012* (2013.01); *B01J 2523/00* (2013.01); *Y02T 10/24* (2013.01)

(56) References Cited

U.S. PATENT DOCUMENTS

| | | | |
|---|---|---|---|
| 8,001,768 | B2 | 8/2011 | Cleary et al. |
| 8,496,896 | B2* | 7/2013 | Golden et al. ............ 423/213.2 |
| 2005/0129601 | A1* | 6/2005 | Li et al. ................... 423/239.2 |
| 2006/0223694 | A1* | 10/2006 | Gandhi et al. ................ 502/60 |
| 2007/0269353 | A1* | 11/2007 | Li et al. .......................... 422/176 |
| 2009/0324468 | A1* | 12/2009 | Golden et al. ............... 423/210 |
| 2009/0324469 | A1* | 12/2009 | Golden et al. ............... 423/212 |
| 2009/0325792 | A1* | 12/2009 | Oljaca et al. .................. 502/303 |
| 2010/0233045 | A1* | 9/2010 | Kim et al. ..................... 422/177 |
| 2010/0240525 | A1* | 9/2010 | Golden et al. .................. 502/65 |
| 2010/0319320 | A1 | 12/2010 | Mittal et al. |
| 2011/0305612 | A1* | 12/2011 | Muller-Stach et al. ........ 423/212 |
| 2011/0305615 | A1* | 12/2011 | Hilgendorff ............... 423/213.5 |

* cited by examiner

LOW COST LEAN NO$_x$ REDUCTION CATALYST SYSTEM

TECHNICAL FIELD

This disclosure pertains to an exhaust aftertreatment system including a collection of particulate catalyst materials to promote the reduction of nitrogen oxides (NO$_X$) to nitrogen (N$_2$) and water in an exhaust gas flow from an engine that cyclically operates by burning lean and rich mixtures of air and fuel. The NO$_X$ reduction catalyst materials are housed within at least one catalyzed flow-through reactor to facilitate intimate contact between the NO$_X$ reduction catalyst particles and the exhaust gas flow from the engine.

BACKGROUND OF THE INVENTION

Diesel engines, some gasoline fueled engines and many hydrocarbon-fueled power plants are operated at higher than stoichiometric air-to-fuel mass ratios for improved fuel economy. The hot exhaust gas produced by such lean-burn engines generally contains a relatively high concentration of oxygen (about one to ten percent by volume) and water, as well as unwanted gaseous emissions that may need to be converted to more innocuous substances before being discharged to the atmosphere. The gaseous emissions primarily targeted for abatement include carbon monoxide (CO), unburned and partially burned hydrocarbons (HC), and nitrogen oxide compounds (NO$_X$). The NO$_X$ constituent in the exhaust gas produced by a lean-burn engine comprises mostly NO (greater than 90 mol %) with some NO$_2$ (less than 10 mol %) and nominal amounts of N$_2$O. To the extent that the hydrocarbon fuel contains sulfur, the exhaust gas may also contain sulfur dioxide (SO$_2$).

Exhaust gas treatment systems that include specially catalyzed flow-through reactors are commonly used to effectively treat exhaust gas flows. In general, these treatment systems—and the catalyst materials therein—are designed to promote (1) the oxidation of CO to CO$_2$, (2) the oxidation of HC to CO$_2$ and water, and (3) the reduction of NO$_X$ to N$_2$ and water.

In general, the HC, CO, NO$_X$ and oxygen (O$_2$) content of an exhaust flow from an internal combustion engine is not constant, but changes due to variations in the air-to-fuel mass ratio (AFR) of the combustible mixture delivered to the engine. The stoichiometric AFR of a combustible mixture of air and fuel is when exactly enough oxygen in the supplied air is present to completely burn all of the fuel. For standard gasoline fuel, the stoichiometric AFR is 14.7:1. Stoichiometric combustible mixtures and mixtures that contain an excess of fuel (i.e., AFR≤14.7) are referred to as "rich." Engines that operate by burning rich mixtures of air and fuel produce an exhaust flow with relatively high amounts of unburned or partially burned fuel (e.g., CO and HC) and small amounts of O$_2$. On the other hand, combustible mixtures that contain an excess of air (i.e., AFR>14.7:1) are referred to as "lean." Exhaust flows from engines that operate by burning lean combustible mixtures contain relatively high amounts of O$_2$ and NO$_X$ (about 90 mol % NO, less than 10 mol % NO$_2$ and nominal amounts of N$_2$O) and relatively low amounts of CO and HC.

Variations in the AFR of a combustible mixture may be intentional, for example, in order to optimize the fuel-efficiency of the engine. Alternatively, the AFR of combustible mixtures may oscillate above and below a predetermined target value due to frequent accelerations and decelerations of the vehicle. In either case, effective exhaust aftertreatment systems for automotive vehicles must be tolerant to such changing exhaust flow conditions so that the variable amounts of HC, CO and NO$_X$ in the exhaust flow are continuously treated.

Several treatment systems have been developed for vehicle applications. One conventional approach is to use a selective catalytic reduction (SCR) system to promote the reduction of NO$_X$ in a high-oxygen content exhaust flow. An SCR operates by injecting a reductant material, such as ammonia (NH$_3$) or hydrocarbons (HC), into the exhaust flow before it is passed in contact with an NO$_X$ reduction catalyst. The reductant material reacts with NO$_X$ in the presence of O$_2$ over the NO$_X$ reduction catalyst to form N$_2$. However, most SCR systems require a reservoir of the reductant and a dosing device to inject a controlled amount of the reductant into the exhaust flow. Additionally, the reductant must be injected far enough upstream of the reduction catalyst material to ensure uniform mixing in the exhaust gas.

An alternative catalyst system, known as a lean NO$_X$ trap (LNT), is designed to treat an NO$_X$-containing exhaust flow from an engine that cyclically operates by burning lean and rich mixtures of air and fuel. The corresponding modes of engine operation are referred to as fuel-lean and fuel-rich, respectively. During the fuel-lean mode of engine operation, excess O$_2$ in the exhaust flow creates an oxidizing exhaust environment, wherein NO is readily oxidized to NO$_2$ over an NO$_X$ oxidation catalyst and is stored as a nitrate species over an NO$_X$ storage material. The engine is briefly and repeatedly operated in the fuel-rich mode to increase the amount of reductants (e.g., CO and HC) in the exhaust flow, which triggers the release of NO$_2$ from the NO$_X$ storage material and the reduction of NO$_2$ over a NO$_X$ reduction catalyst. Conventional LNTs use platinum (Pt) as the NO$_X$ oxidation catalyst and platinum (Pt), palladium (Pd) or rhodium (Rh) as the NO$_X$ reduction catalyst to effectively convert NO$_X$ to N$_2$. But platinum group metals (PGMs), such as Pt, Rh and Pd, are a particularly expensive, and there is a need for less-expensive oxidation and reduction catalyst materials with equally comparable efficiency.

SUMMARY OF THE INVENTION

The exhaust aftertreatment system of the present invention includes a collection of catalyst materials that, in combination, can effectively reduce an amount of NO$_X$ to N$_2$ and water in a high-oxygen content exhaust flow from an engine that is controlled to operate by cyclically burning lean and rich mixtures of air and fuel. This collection of catalyst materials may be referred to herein as an NO$_X$ reduction catalyst system. The catalyst materials of the NO$_X$ reduction system are dispersed onto high surface area support bodies which are housed within flow-through reactors and positioned within the exhaust system of the engine to facilitate intimate contact between the catalyst materials and the exhaust flow from the engine. The high surface area support bodies are preferably of extruded ceramic and are in the shape of honeycomb monoliths.

The catalyst materials of the NO$_X$ reduction system comprise (1) lanthanum-based perovskite oxide particles to oxidize NO to NO$_2$, (2) barium oxide (BaO) particles chemically deposited onto mixed oxide particles of cerium and zirconium (CeO$_2$—ZrO$_2$) to adsorb or store NO$_2$ as a nitrate species, (3) copper oxide (CuO) nanoparticles chemically deposited onto particles of cerium oxides (CeO$_2$) to reduce NO$_X$ to N$_2$ and to generate NH$_3$, and (4) particles of a selective reduction catalyst to adsorb or store NH$_3$ and to reduce any residual NO$_X$ to N$_2$.

The catalyst materials of the $NO_X$ reduction system may be located in one or more flow-through reactors within the exhaust system of the engine. For example, a first reactor may be close-coupled to the exhaust manifold of the engine and may contain at least one of the $NO_X$ reduction catalyst materials. A second reactor may be positioned downstream of the first reactor in the exhaust flow and may contain at least one of the remaining $NO_X$ reduction catalyst materials. In preferred embodiments, the particles of lanthanum-based perovskite oxides, barium oxides, and copper oxides are housed within the first reactor, and the particles of a selective reduction catalyst are housed within the second reactor.

The $NO_X$ reduction catalyst materials may be dispersed onto the one or more support bodies in the form of at least one thin washcoat layer. For example, the catalyst materials located in the first reactor may be dispersed onto a single support body in a variety of multiple-layer arrangements. In a suitable "dual-layer" arrangement, a first washcoat layer, comprising a mixture of lanthanum-based perovskite oxide particles and barium oxide particles may be coated onto the support body, and a second washcoat layer comprising the copper oxide nanoparticles may be coated onto the support body overlying the first washcoat layer. In a suitable "zone-coat" arrangement, the first washcoat layer may be coated onto a first portion, or zone, of the support body, while the second washcoat layer may be coated onto a second portion, or zone, of the support structure.

In preferred embodiments of this invention, the engine is controlled to repeatedly operate in a fuel-lean mode for a major portion of an engine control cycle, and in a fuel-rich mode for a minor portion of the engine control cycle. An engine that operates in this cyclical manner may be referred to herein as "a lean/rich cycling engine." As used herein, the term "fuel-lean mode" refers to a mode of engine operation in which the engine burns a lean mixture of air and fuel (i.e., AFR>14.7), and the term "fuel-rich mode" refers to a mode of engine operation in which the engine burns a rich mixture of air and fuel (i.e., AFR≤14.7). The engine's mode of operation may be controlled, for example, by an electronic control module (ECM) in connection with an electronic fuel injection system. The electronic fuel injection system continuously manages the AFR of the mixture of air and fuel that is delivered to the cylinders of the engine in accordance with an engine control strategy.

In practice, the exhaust flow from the lean/rich cycling engine is passed in contact with the catalyst materials of the $NO_X$ reduction system for treatment of the exhaust gas, which occurs in multiple steps. Excess oxygen in the exhaust flow during the fuel-lean mode of engine operation promotes the oxidation of NO to $NO_2$ over the lanthanum-based perovskite oxide particles. $NO_X$ in the exhaust flow is then stored as a nitrate species (e.g. $Ba(NO_3)_2$) at $NO_X$ storage sites of the barium oxide particles until the fuel-rich mode of engine operation. During the fuel-rich mode, fuel constituents (such as hydrogen, $H_2$, and HC) in the exhaust flow trigger the release of $NO_X$ from the $NO_X$ storage sites and the reduction of the released $NO_X$ to $N_2$ over the copper oxide nanoparticles. Ammonia ($NH_3$) is also generated during the fuel-rich mode when $NO_X$ reacts with $H_2$ over the copper oxide nanoparticles.

In most circumstances, the $NO_X$ reduction catalyst materials of the first reactor, comprising the particles of lanthanum-based perovskite oxides, barium oxides, and copper oxides, will be able to remove a significant amount of $NO_X$ from the exhaust flow. However, $NO_X$ may slip through the first reactor, for example, during extended periods of fuel-lean operation. In addition, it may be desirable to reduce the amount of $NH_3$ in the exhaust flow before discharge to the atmosphere. Therefore, in preferred embodiments, the second reactor, comprising particles of a selective reduction catalyst, is positioned downstream of the first reactor in order to consume any breakthrough $NO_X$ and $NH_3$. During periods of fuel-rich operation, $NH_3$ is adsorbed on $NH_3$ storages sites of the selective reduction catalyst particles located within the second reactor until fuel-lean engine operation resumes. In the fuel-lean mode of engine operation, the $NH_3$ desorbs from the $NH_3$ storages sites and reacts with $NO_X$ in the excess $O_2$ environment over the selective reduction catalyst particles to form $N_2$.

In preferred embodiments of this invention, the duration of each mode of engine operation is controlled to minimize $NO_X$ breakthrough during fuel-lean operation and to prevent $NH_3$ from being discharged to the atmosphere during fuel-rich operation. Therefore, the fuel-rich mode of engine operation is preferably initiated whenever the $NO_X$ storage sites reach their storage limit. However, fuel-rich operation should only continue so long as the $NH_3$ storage sites have not reached their $NH_3$ storage limit. In addition, the $NO_X$ reduction performance of the selective reduction catalyst is maximized when the molar ratio of $NH_3$:$NO_X$ is 1:1. Therefore, the fuel-rich mode of engine operation should also be initiated whenever the ratio of adsorbed $NH_3$ on the $NH_3$ storage sites to the amount of $NO_X$ in the exhaust flow is less than 1:1. By controlling the engine to operate in this way, the tolerance of the exhaust treatment system to changing exhaust gas environments is improved, as well as the system's overall $NO_X$ reduction performance.

Other objects and advantages of the invention will be apparent from a further description of preferred (but not-limiting) embodiments of the invention.

DESCRIPTION OF PREFERRED EMBODIMENTS

It is found that copper oxide (CuO) nanoparticles that have been chemically deposited onto particles of cerium oxides ($CeO_2$) can be used to reduce $NO_X$ to $N_2$ and water and to generate $NH_3$ in a high-oxygen content exhaust gas flow. Further, these $CuO/CeO_2$ particles can be used in combination with lanthanum-based perovskite oxide particles, barium oxide particles chemically deposited onto particles of cerium and zirconium mixed oxides ($BaO/CeO_2$—$ZrO_2$), and particles of a selective reduction catalyst to form a $NO_X$-reduction catalyst system for use in an exhaust aftertreatment system of an internal combustion engine. When suitably combined in the aftertreatment system, these $NO_X$-reduction catalyst materials can effectively reduce an amount of $NO_X$ to $N_2$ and water in an oxygen-rich exhaust gas flow, such as from a lean-burn engine.

The $CuO/CeO_2$ particles are preferably prepared using an incipient wetness impregnation technique. In suitable embodiments, a copper nitrate solution having a suitable concentration of copper ions is added to a predetermined amount of cerium oxide particles so that the $CuO/CeO_2$ catalyst particles preferably comprise between 2-20 wt. % Cu. The $BaO/CeO_2$—$ZrO_2$ particles are also preferably prepared using the incipient wetness impregnation technique. In suitable embodiments, a barium acetate solution is added to a predetermined amount of $CeO_2$—$ZrO_2$ particles so that the $BaO/CeO_2$—$ZrO_2$ particles preferably comprise between 10-20 wt. % BaO.

Suitable lanthanum-based perovskite oxide particles may be represented by the formula $LaMO_3$, where M comprises at least one of cobalt (Co), titanium (Ti), zirconium (Zr), niobium (Nb), tin (Sn), cerium (Ce), aluminum (Al), nickel (Ni), chromium (Cr), manganese (Mn), copper (Cu), and iron (Fe). Some specific and exemplary lanthanum-based perovskite oxides include $LaCoO_3$, $La_{0.9}Sr_{0.1}CoO_3$, $LaMnO_3$, $La_{0.9}Sr_{0.1}MnO_3$, $LaFeO_3$, and $La_{0.9}Sr_{0.1}FeO_3$. If $LaMnO_3$ particles are used, it is suitable to prepare them from a solution of lanthanum and manganese nitrates and citric acid monohydrate.

Suitable selective reduction catalysts include base metal ion-substituted zeolites and/or a base metal ion-substituted silicoaluminophosphates (SAPOs). If the selective reduction catalyst is a base metal ion-substituted zeolite, it may be an Fe and/or Cu substituted β-type, Y-type, ZSM-5, Chabazite or ultra-stable Y-type. Suitable base metal ion-substituted SAPOs include Fe and/or Cu substituted SAPO-5, SAPO-11, SAPO-34 and SAPO-44, and mixtures thereof. Each of these zeolites and SAPOs are commercially available in powder form.

Figure 1:
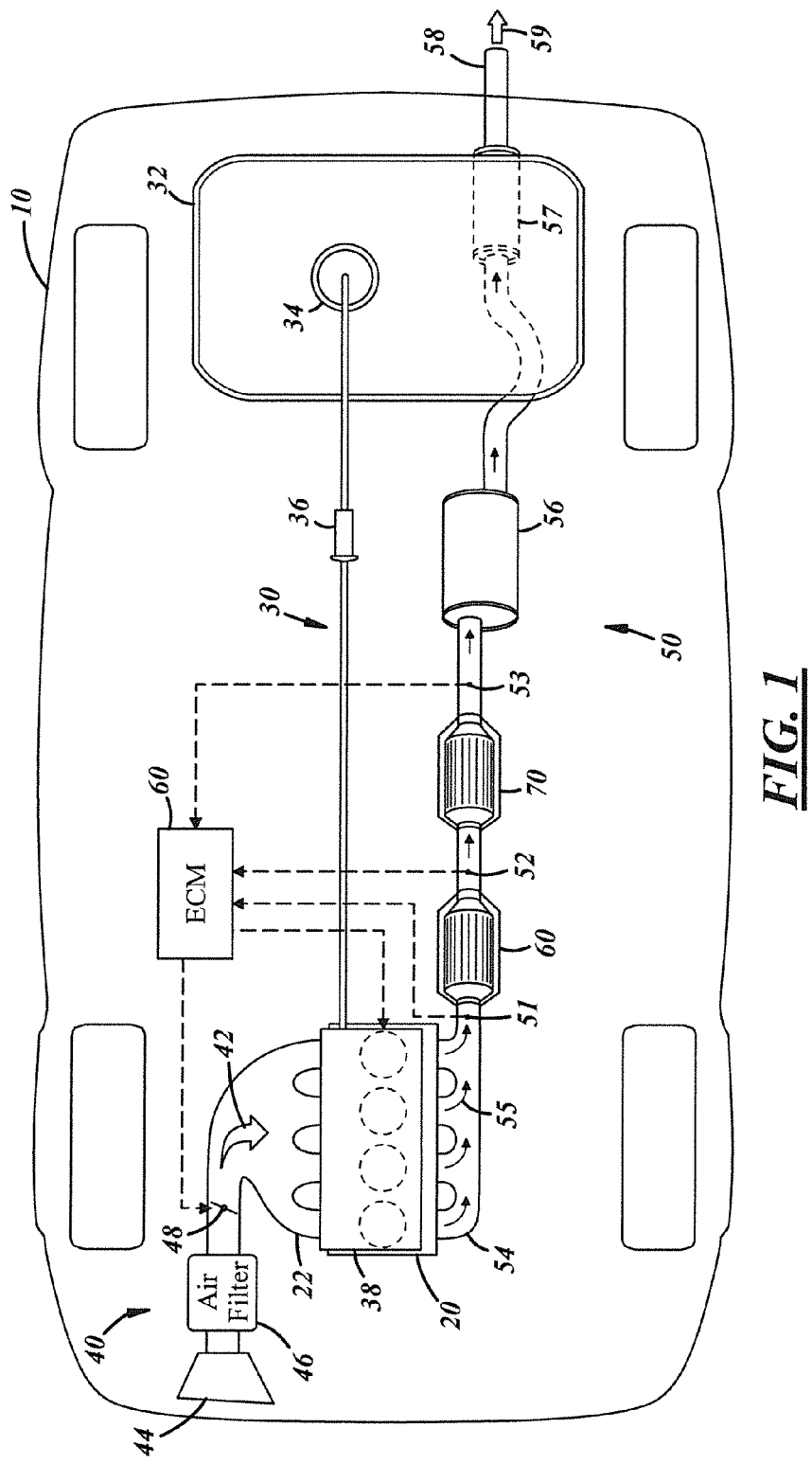
FIG. 1 is a schematic illustration of an overhead view of an automotive vehicle which includes an internal combustion engine, a fuel supply system, an air induction system and an exhaust system.

FIG. 1 is a schematic illustration of an overhead view of an automotive vehicle 10 that includes an internal combustion engine 20, a fuel supply system 30, an air induction system 40 and an exhaust system 50. The multi-cylinder, reciprocating piston, internal combustion engine 20 of the present invention may be a charge compression engine (i.e., diesel engine), a spark ignition direct injection engine (i.e., gasoline engine), or a homogeneous charge compression ignition engine. Each of these types of engines operate by burning a combustible mixture of air (about 78.1 vol. % $N_2$ and 20.9 vol. % $O_2$) and hydrocarbon fuel (an organic compound of hydrogen and carbon atoms).

The engine 20 is supplied with a continuous air flow 42 by the air induction system 40, which includes an air intake 44, an air filter 46, a throttle-body valve 48 and an intake manifold 22 coupled to the engine 20. The engine 20 is supplied with fuel by the fuel supply system 30, which includes a fuel tank 32, a fuel pump 34, a fuel filter 36 and an electronic fuel injection system 38. The electronic fuel injection system 38 includes at least one fuel injector or nozzle (not shown) which dispenses pressurized fuel into the incoming air flow 42. A single fuel injector may be located upstream of the engine 20 near the throttle-body valve 48 and may simultaneously supply fuel to all of the cylinders of the engine 20. Alternatively, several fuel injectors may be positioned near intake valve openings of the cylinders of the engine. In diesel engines, each cylinder is equipped with a fuel injection nozzle which sprays fuel directly into the cylinders.

The fuel injection system 38 is controlled by an electronic control module (ECM) 60 that continuously manages the air-to-fuel mass ratio of the mixture of air and fuel that is delivered to the engine 20 in accordance with an engine control strategy. The ECM 60 monitors the engine's operating parameters by receiving input signals from various components of the engine, for example from sensors 51, 52, 53 in the exhaust system 50. In turn, the ECM 60 sends corresponding output signals to actuators (not shown) that operate the fuel injectors (not shown) and the throttle-body valve 48 so that the mixture of air and fuel exhibits the instantly desired air-to-fuel mass ratio. The quantity of fuel injected into the incoming air flow 42 is controlled to maintain a predetermined lean air-to-fuel mass ratio or a predetermined rich air-to-fuel mass ratio, or to switch between the two modes of engine operation.

The mixture of air and fuel is supplied to cylinders (usually four to eight) of the engine and—upon ignition—oxygen atoms in the air react exothermically with hydrogen and carbon atoms of the fuel to produce nitrogen, carbon dioxide and water. These combustion products are expelled from the cylinders of the engine through an exhaust manifold 54 as an exhaust gas flow 55. In practice, however, complete combustion does not occur in the cylinders. Therefore, the exhaust flow 55 from the engine 20 may also contain by-products of incomplete combustion, such as unburned hydrocarbons and partially burned hydrocarbons as carbon monoxide. The exhaust flow 55 will also contain nitrogen oxides as a result of nitrogen atoms in the air reacting with oxygen atoms in the high-temperature combustion environment.

The exhaust system 50 of the vehicle 10 defines a contained passageway that is configured to receive the exhaust flow 55 from the engine 20 and to discharge a treated exhaust flow 59 from the tailpipe 58 to the environment. Treatment of the exhaust flow 55 is primarily accomplished by passing the exhaust flow 55 through various treatment systems. For example, a typical exhaust system 50 of an automotive vehicle 10 includes a muffler 56 and a resonator 57. The exhaust system 50 of the present invention also includes at least one catalyzed flow-through reactor 60, 70 capable of reducing $NO_X$ to $N_2$ and water in the exhaust flow. The exhaust system shown in FIG. 1 depicts two catalyzed flow-through reactors 60, 70, each of which contains at least one of the catalyst materials of the $NO_X$ reduction catalyst system. In preferred embodiments of this invention, the upstream catalyzed flow-through reactor 60 contains predetermined amounts of the following catalyst particles: $LaMnO_3$, $BaO/CeO_2$—$ZrO_2$, and $CuO/CeO_2$. The downstream catalyzed flow-through reactor 70 preferably contains a predetermined amount of the selective reduction catalyst particles.

Figure 2:
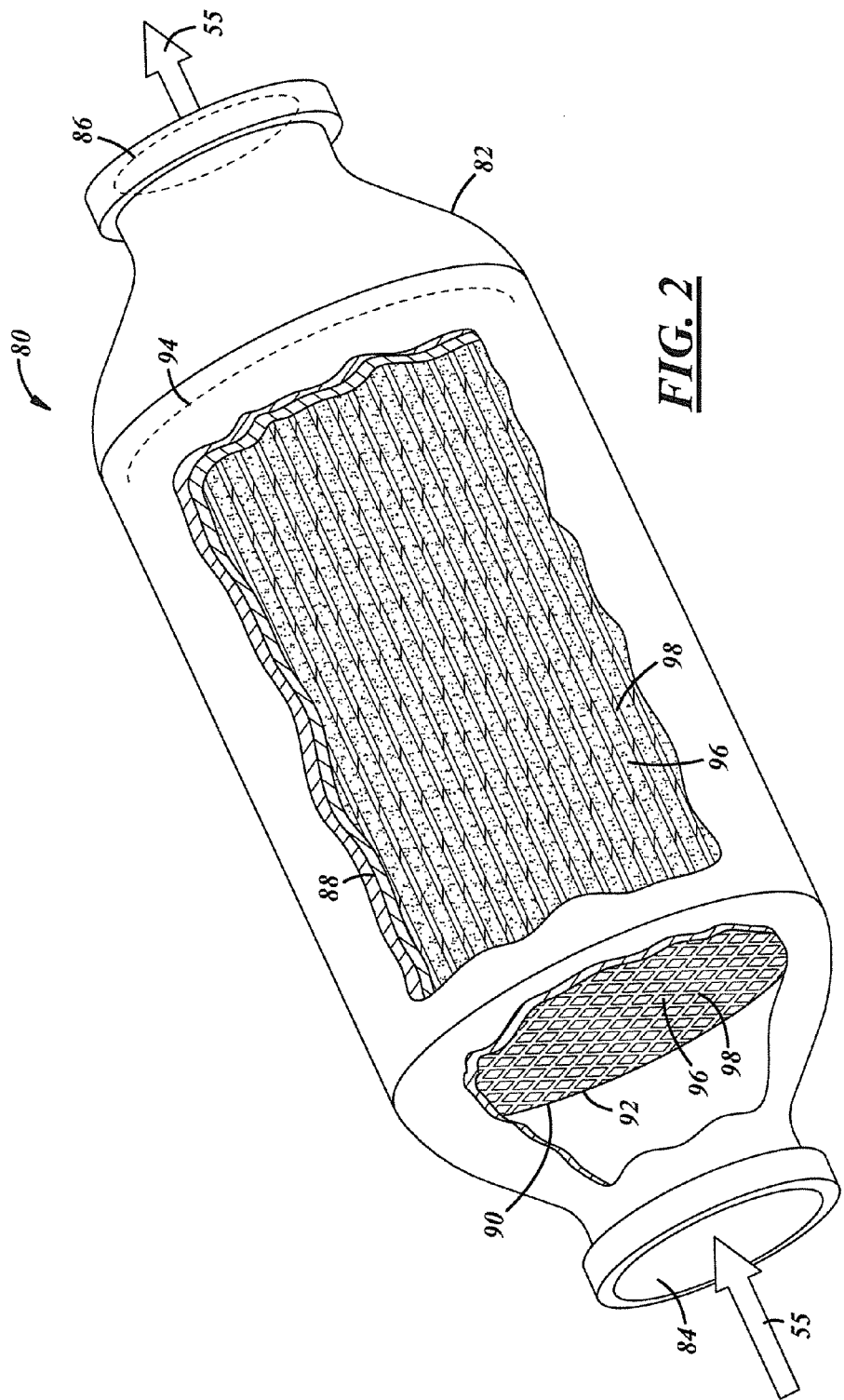
FIG. 2 is a schematic illustration of a catalyzed flow-through reactor piped within the exhaust system shown in FIG. 1. The catalyzed flow-through reactor includes a container, a catalyst-bearing support body and a mounting material. The support body includes several small, square, parallel flow-through channels defined by walls that extend longitudinally from an inlet face to an outlet face of the support body.

By way of illustration, a suitable catalyzed flow-through reactor 80 for the $NO_X$ reduction catalyst system is shown in FIG. 2. The catalyzed flow-through reactor 80 comprises an alloy steel container 82 shaped with an upstream opening 84 configured to receive the exhaust flow 55, and a downstream opening 86 configured to discharge the exhaust flow 55. The body of the container 82 is often round or elliptical in cross-section and is sized to hold a catalyst-bearing support body 90. The support body 90 is held in place within the container 82 by a thermally insulating and physically durable mounting material 88.

The support body 90 may be an extruded ceramic, honeycomb-shaped monolith with an inlet face 92 and an outlet face 94 transverse to the direction of exhaust flow 55. The support body 90 includes several small, square, parallel flow-through channels 96 defined by walls 98 that extend longitudinally from the inlet face 92 to the outlet face 94 of the support body 90. The inlet face 92 of the support body 90 is sized to provide a suitable number of channels 96 (preferably, at least 400 per square inch) to collectively accommodate a desired flow rate for the exhaust flow 55, and, thus, a desired residence time of the exhaust gas within the support body 90. In FIG. 2, a portion of the container 82, mounting material 88 and support body 90 have been cut-away to better reveal the many internal channel openings 96 and the channel walls 98 extending therethrough.

In practices of this invention, fine particles of the catalyst materials of the $NO_X$ reduction catalyst system are deposited onto the walls 98 of the small flow-through channels 96 in the form of a thin washcoat layer or layers (not shown). The high total surface area of the many channel walls 98 provides sufficient contact surface area between the exhaust flow 55 and the catalyst particles (not shown) for the desired oxidation and reduction reactions to occur.

The catalyst materials of the $NO_X$ reduction catalyst system may be deposited on the channel walls 98 of the support body 90 in a variety of arrangements. For example, each of the $NO_X$ reduction catalyst materials may be dispersed onto one or more of the support bodies in separate washcoat layers. Alternatively, more than one of the $NO_X$ reduction catalyst materials may be intimately mixed together and thereafter dispersed onto a first support body as a single washcoat layer that comprises a mixture of the $NO_X$ reduction catalyst materials. In suitable embodiments, particles of $LaMnO_3$, $BaO/CeO_2$—$ZrO_2$, and $CuO/CeO_2$ may be dispersed onto a single support body in the form of at least two washcoat layers. In a "dual-layer" arrangement, a first washcoat layer comprises a particulate mixture of the $LaMnO_3$ and $BaO/CeO_2$—$ZrO_2$ catalyst particles, and a second washcoat layer, overlying the first washcoat layer, comprises particles of $CuO/CeO_2$. In a suitable "zone-coat" arrangement, the first washcoat layer is coated onto a first portion, or zone, of the support body while the second washcoat layer is coated onto a second portion, or zone, of the support body.

The exhaust flow may be exposed to other devices or mechanical equipment not expressly shown in FIG. 1 that may or may not help treat the exhaust flow. These devices include, for example, a diesel oxidation catalyst, a three-way catalyst, a diesel particulate filter, an exhaust gas recirculation line, and a turbocharger turbine. Skilled artisans will undoubtedly know of, and understand, these and the many other devices that the exhaust flow could be exposed to.

EXAMPLES

The following experimental examples present suitable methods of making the catalyst materials of the $NO_X$ reduction catalyst system, as well as methods of supporting the catalyst materials to facilitate intimate contact between the catalyst materials and an exhaust gas stream from a lean/rich cycling engine.

Example 1

The $LaMnO_3$ perovskite oxide particles were suitably prepared for use as powder catalysts by a citrate method. Appropriate amounts of lanthanum nitrate, $La(NO_3)_3$, and manganese nitrate, $Mn(NO_3)_2$, were dissolved in de-ionized water followed by stirring for about 10 minutes. It was preferable to use nitrates of La and Mn because they produce very little, if any, by-product residues when thermally decomposed and, during such thermal decomposition, evolve a relatively large amount of gas which promotes extensive particle surface area and porosity. Citric acid monohydrate was then added to the solution at 10 mol % in excess of stoichiometry. The solution was stirred for about 10 minutes to complex the La and Mn cations.

Next, in the dehydration step, the solution was heated to 80° C. under continuous stirring to slowly evaporate the water until the solution became a viscous gel. The temperature was then ramped up at a rate of 10° C. per minute to further heat the viscous gel and initiate gas evolution. The evolution of NO and $NO_2$ gases began around 150° C. and, when the temperature reached just below 300° C., vigorous combustion of the citrate ions occurred and resulted in a large spike in temperature and powder displacement. The resulting spongy material was crushed and calcined at 700° C. for about 5 hours in a flow of air to produce particles of $LaMnO_3$ perovskite oxides.

Example 2

An incipient wetness impregnation technique was used to chemically deposit particles of barium, copper and palladium onto high surface area support particles to form catalyst particles of $BaO/CeO_2$—$ZrO_2$, $CuO/CeO_2$ and $Pd/CeO_2$.

In this method of catalyst preparation, a salt of the metal catalyst was dissolved in de-ionized water. A suitable amount of the metal-containing solution was then added to a suitable amount of porous support particles so that substantially all of the solution was drawn into the pores of the support particles by capillary action. The metal solution-containing support particles were then dried and calcined to vaporize the liquid, and deposit the metal ions onto surfaces of the support particles. The impregnated support particles were then calcined in an oven at 550° C. for 5 hours. In suitable embodiments, the catalyst particles may be further refined after calcination, if desired, to reduce their size even more before being incorporated into a washcoat solution. Ball milling or any other known particle refinement process may be used to achieve such an objective. The maximum loading of the metal catalyst on the support particles is limited by the solubility of the metal salt in the precursor solution.

Barium oxide was chemically deposited onto particles of $CeO_2$—$ZrO_2$ (30 wt. % $CeO_2$ and 70 wt. % $ZrO_2$ from Rhodia) by impregnating the $CeO_2$—$ZrO_2$ particles with barium acetate, $Ba(CH_3COO)_2$, to give a loading of 20 wt. % BaO. Copper oxides were chemically deposited onto particles of $CeO_2$ (from Rhodia) by impregnating the $CeO_2$ particles with copper nitrate, $Cu(NO_3)_2$, to give a loading of 2 wt. % Cu. Palladium was chemically deposited onto particles of $CeO_2$ by impregnating the $CeO_2$ particles with palladium nitrate, $Pd(NO_3)_2$, to give a loading of 2 wt. % Pd.

Example 3

In these experimental examples, 4 grams of the as-prepared powder catalysts and 15 grams of water were ball milled for 18 hours so that the catalyst particles were preferably about 10 to 20 nanometers in diameter. The cordierite monolith samples used in these examples were ¾ inch diameter by 1 inch length with 400 cells per square inch (cpsi) and a wall thickness of 4 milli-inches. The washcoated monolith samples were dried at 120° C., calcined at a temperature of about 550° C. for 5 hours in static air and then aged in an oven for 24 hours at 700° C. in air comprising 10 vol. % water.

The catalyst materials of the $NO_X$ reduction catalyst system were tested in a quartz tubular reactor operated at atmospheric pressure by passing a gas stream over and through a volume of the catalyst particles contained as a washcoat layer or layers on the walls of passages of the monolith samples. The gas stream was formulated to simulate the composition of an exhaust gas flow produced by an internal combustion engine. The simulated gas stream was fed to the reactor using a series of mass flow controllers. The total feed flow rate was 3.0 L/minute, corresponding to a space velocity of 25,000 $h^{-1}$. In these and the following experiments, the value of space velocity refers to the ratio of the volumetric flow rate of the gas stream (at STP) with respect to the nominal volume of the cordierite monolith samples (the volume is arbitrarily based on its outer cross-sectional area and length).

The reactor was heated in a tube furnace to control the temperature just upstream of the catalyst-coated monolith sample. Thermocouples were used to measure the temperature upstream and downstream of the monolith samples. The reactor outlet stream was analyzed with a Fourier Transform Infrared (FTIR) analyzer (ThermoNicolet NEXUS 670) calibrated at 940 Torr and 165° C. A pressure controller at the outlet of the FTIR was used to maintain the calibration pressure, and the line downstream of the reactor was heated to 165° C. The lines upstream of the reactor were also heated to 165° C. to assure complete vaporization of water.

Example 4

In this experimental example, a first monolith core sample was washcoated with a slurry comprising the as-prepared particles of $CuO/CeO_2$, and a second monolith core sample was washcoated with a slurry comprising particles of palladium chemically deposited onto support particles of $CeO_2$ using the incipient wetness impregnation technique (Pd/$CeO_2$). The NO to $NH_3$ conversion performance of the $CuO/CeO_2$ and $Pd/CeO_2$ particulate catalyst materials was evaluated separately in a quartz tubular reactor.

To evaluate the NO to $NH_3$ conversion performance of these particulate catalysts, the gas stream fed to the reactor was formulated to simulate the composition of an exhaust flow from an engine that is operated by burning a rich mixture of air and fuel. The gas stream comprised 200 ppm NO, 10 vol. % $CO_2$, 5 vol. % $H_2O$, 1.5 vol. % CO, and 0.5 vol. % $H_2$, with $N_2$ as balance. The catalysts were heated from 100° C. to 450° C. with a ramp rate of 10° C. per minute in the simulated gas stream. The concentration of NO and $NH_3$ in the gas stream from the reactor outlet was continuously monitored by the FTIR.

Figure 3:
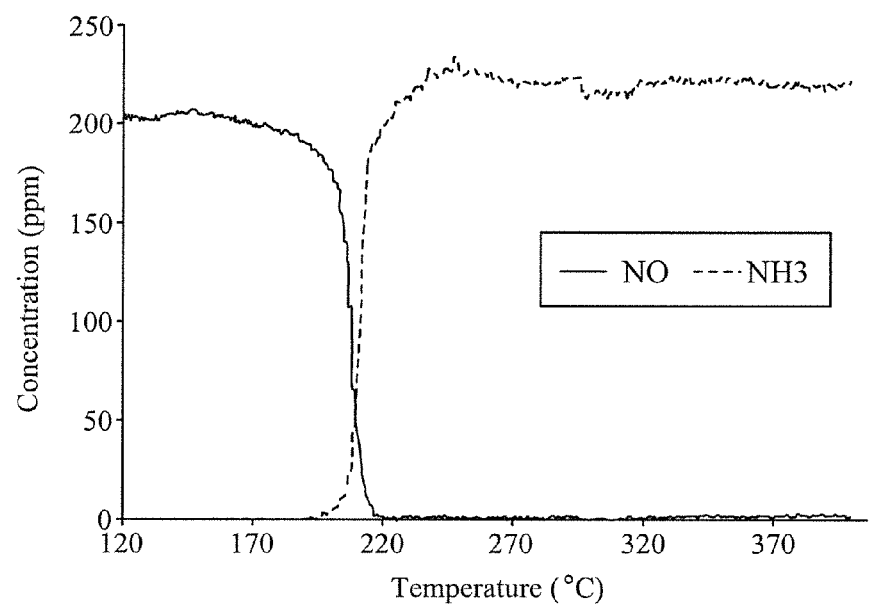
FIG. 3 is a graph of Concentration (ppm) vs. Temperature (° C.) showing the $NH_3$ generation performance of the $CuO$/$CeO_2$ catalyst as a function of temperature in a gas stream comprising 200 ppm NO, 10% $CO_2$, 1.5% CO, 0.5% $H_2$, 5% $H_2O$ with $N_2$ as balance. The NO-containing gas stream was passed over and through a volume of the $CuO$/$CeO_2$ catalyst particles dispersed on channel walls of an extruded cordierite monolith core sample as a single washcoat layer and thereafter the concentration of NO and $NH_3$ in the gas stream was re-measured.

FIG. 3 shows the NO and $NH_3$ concentration profiles as a function of temperature from 120° C. to 400° C. over the $CuO/CeO_2$ catalyst under fuel-rich conditions. At about 220° C., the concentration of NO in the gas stream from the reactor outlet was not detectable, indicating that 100% of the NO contained in the feed stream was converted to $NH_3$. At the same temperature, the concentration of $NH_3$ in the gas stream from the reactor outlet was about 200 ppm, indicating that the conversion reaction proceeded stoichiometrically, with one mole of $NH_3$ generated per mole of NO fed to the reactor.

The NO and $NH_3$ concentration profiles as a function of temperature over the $Pd/CeO_2$ catalyst are not shown. The results, however, indicate that the $CuO/CeO_2$ catalyst and the $Pd/CeO_2$ catalyst have comparable performance for $NH_3$ generation from NO in fuel-rich exhaust gas conditions. But, the $CuO/CeO_2$ catalyst was able to achieve 100% NO to $NH_3$ conversion at a temperature of only 220° C., while the $Pd/CeO_2$ catalyst only achieved 100% NO to $NH_3$ conversion at a temperature of about 420° C. Therefore, the $CuO/CeO_2$ catalyst may be better suited for low temperature catalyst applications than the $Pd/CeO_2$ catalyst.

Example 5

In this experimental example, the catalyst materials of the $NO_X$ reduction system were evaluated in combination. One half amount of a monolith core sample was washcoated with a slurry comprising a mixture of $LaMnO_3$ particles and $BaO/CeO_2$—$ZrO_2$ particles, and the other half of the monolith sample was washcoated with a slurry comprising particles of the $CuO/CeO_2$ catalyst or the $Pd/CeO_2$ catalyst.

The catalyst materials were tested in the same reactor system as Example 4, but, as discussed above in this specification, the $NO_X$ reduction catalyst system functions most effectively when the catalyst materials are cyclically exposed to both an oxidizing and reducing exhaust gas environment. Therefore, the composition of the gas stream fed to the reactor was cycled between fuel-lean and fuel-rich conditions and the reactor was held at a steady temperature of 350° C.

The composition of the gas stream was cycled using a gas manifold consisting of three banks of flow controllers that each provided gases to the reactor. Bank A (fuel-rich feed) contained flow controllers that provided 0.5 vol. % $H_2$ and 1.5 vol. % CO balanced with $N_2$ and the total flow rate was 1.0 L/min. Bank B (fuel-lean feed) contained flow controllers that provided 8 vol. % $O_2$ gases, also balanced with $N_2$, and the total flow rate was 1.0 L/min. During cyclic operations the A/B solenoid valve was switched between bank A and bank B at the desired frequency (lean/rich=60 s/30 s). Bank C contained the gases that did not cycle (NO, $H_2O$, $CO_2$ and $N_2$) and the flow rate was 2 L/min. Therefore the total gas flow rate was at 3 L/min on a dry gas basis, corresponding to a space velocity of 25,000 $h^{-1}$.

The standard test conditions of the lean mixture gases included 100 ppm NO, 8 vol. % $O_2$, 5 vol. % $H_2O$, 10 vol. % $CO_2$ and $N_2$ as a balance. The duration of the lean cycle was 60 seconds. The rich mixture gases included 100 ppm NO, 5 vol. % $H_2O$, 10 vol. % $CO_2$, 0.5 vol. % $H_2$, 1.5 vol. % CO and $N_2$ as a balance. The duration of the lean cycle was 30 seconds.

Figure 4:
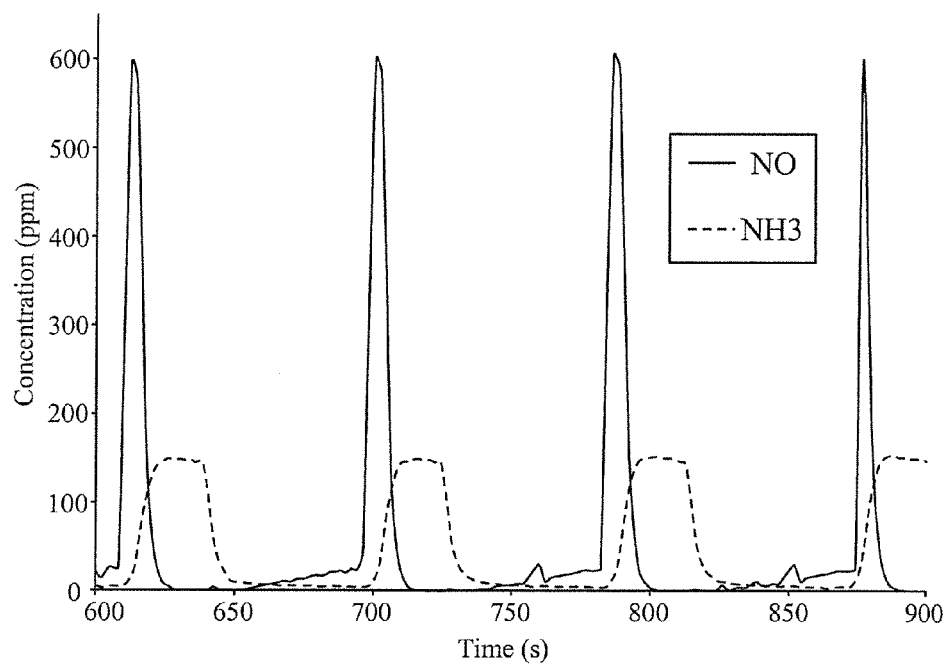
FIG. 4 is a graph of Concentration (ppm) vs. Time (s) showing the $NH_3$ generation performance of the $CuO$/$CeO_2$ catalyst as a function of temperature when used in combination with $LaMnO_3$ and $BaO$/$CeO_2$—$ZrO_2$ particles in a gas stream having a composition that was cyclically varied to simulate the exhaust flow from a lean/rich cycling engine (lean/rich=60 s/30 s). The gas stream was passed over and through a volume of the $NO_X$ reduction catalyst particles that were dispersed on channel walls of an extruded cordierite monolith core sample as first and second washcoat layers, and thereafter the concentration of NO and $NH_3$ in the gas stream was re-measured. The first washcoat layer near the inlet portion of the monolith sample contained a mixture of $LaMnO_3$ particles and $BaO/Al_2O_3$ particles, and the second washcoat layer near the outlet portion of the monolith sample contained $CuO/CeO_2$ particles. In both the lean and rich cycles, the gas stream contained 100 ppm NO, 10 vol. % $CO_2$, 5 vol. % $H_2O$ with $N_2$ as balance. During the lean cycle, the gas stream also contained 8 vol. % $O_2$, and during the rich cycle the gas stream contained 1.5 vol. % CO and 0.5 vol. % $H_2$. The temperature of the gas stream was maintained at 350° C. during both the lean and rich cycles.

FIG. 4 shows the NO and $NH_3$ concentration profiles as a function of time from 600 seconds to 900 seconds over the $LaMnO_3/BaO/CeO_2$—$ZrO_2$ and $CuO/CeO_2$ catalyst under cyclical fuel-lean (60 seconds) and fuel-rich (30 seconds)

conditions. During the fuel-lean cycle, the concentration of NO in the reactor outlet gas stream is relatively low. However, when the feed stream transitions from fuel-lean to fuel-rich conditions, an abrupt spike in the concentration of NO appears. This spike is due to the unbalanced reaction rate between the decomposition rate of nitrates or nitrites from the BaO catalyst particles and the reaction rate of gaseous $NO_X$ with CO or $H_2$. Since, the decomposition rate of nitrates or nitrites from the BaO catalyst is much faster than the reaction rate between $NO_X$ and the reductants, some $NO_X$ may escape the catalyst system during the transition from the fuel-lean to fuel-rich cycle. The release of NO from the an exhaust aftertreatment system can be minimized through the placement of a catalyzed flow-through reactor downstream of the reactor containing the $LaMnO_3/BaO/CeO_2$—$ZrO_2$ and $CuO/CeO_2$ catalyst particles. For example, as discussed above in this specification, a catalyzed flow-through reactor containing particles of a base metal ion-substituted zeolite and/or a base metal ion-substituted silicoaluminophosphate may be used to reduce any breakthrough $NO_X$ to $N_2$ and water.

The average concentration of NO in gas stream from the reactor outlet over the $LaMnO_3/BaO/CeO_2$—$ZrO_2$ and $CuO/CeO_2$ catalyst was about 58 ppm, and the average concentration of $NH_3$ in gas stream from the reactor outlet was about 52 ppm. The NO and $NH_3$ concentration profiles as a function of time over the $Pd/CeO_2$ catalyst are not shown. However, the average concentration of NO in effluent gas from the $Pd/CeO_2$ catalyst was about 25 ppm, and the average concentration of $NH_3$ in effluent gas was about 30 ppm. Thus, the $Cu/CeO_2$ catalyst was able to generate a comparable amount of $NH_3$ to that of the $Pd/CeO_2$ catalyst under cyclical fuel-lean and fuel-rich conditions.

The above description of exemplary embodiments and specific examples are merely descriptive in nature and are not intended to limit the scope of the claims that follow.

The invention claimed is:

1. An exhaust aftertreatment system for reducing nitrogen oxides ($NO_X$) to nitrogen ($N_2$) and water in an exhaust gas flow from a lean/rich cycling engine that is controlled to cyclically operate in a fuel-lean mode and a fuel-rich mode, the system being free of platinum group metal elements and comprising:
a first flow-through reactor comprising an upstream opening configured to receive the exhaust flow and a downstream opening configured to discharge the exhaust flow;
a first flow-through support body contained within the first reactor comprising a plurality of parallel flow-through channels defined by walls extending longitudinally from an inlet face to an outlet face of the support body; and
$NO_X$ reduction catalyst materials deposited on the walls of the flow-through channels of the first support body in the form of at least one washcoat layer, the $NO_X$ reduction catalyst materials being free of platinum group metal elements and comprising lanthanum-based perovskite oxide particles in an amount to oxidize NO to $NO_2$ in the exhaust flow during the fuel-lean mode, barium oxide (BaO) particles deposited on particles of mixed oxides of cerium and zirconium ($BaO/CeO_2$—$ZrO_2$) and present in an amount to remove and temporarily store $NO_X$ from the exhaust flow during the fuel-lean mode, and copper oxide nanoparticles deposited on particles of cerium oxide ($CuO/CeO_2$) in an amount to reduce $NO_X$ to $N_2$ and to generate $NH_3$ in the exhaust flow during the fuel-rich mode.

2. The exhaust aftertreatment system of claim 1 further comprising:
a second flow-through reactor comprising an upstream opening configured to receive the exhaust flow and a downstream opening configured to discharge the exhaust flow, the second reactor being positioned downstream of the first reactor relative to a direction of exhaust flow from the engine;
a second flow-through support body contained within the second reactor comprising a plurality of parallel flow-through channels defined by walls extending longitudinally from an inlet face to an outlet face of the support body; and
particles of a selective reduction catalyst deposited on the walls of the flow-through channels of the second support body in the form of at least one washcoat layer, the selective reduction catalyst particles being present in an amount to remove and temporarily store $NH_3$ from the exhaust flow during the fuel-lean mode and to reduce $NO_X$ to $N_2$ in the exhaust flow during the fuel-rich mode.

3. The exhaust aftertreatment system of claim 1 wherein the $CuO/CeO_2$ particles comprises between 2-20 weight percent copper.

4. The exhaust aftertreatment system of claim 1 wherein the $BaO/CeO_2$—$ZrO_2$ particles comprise between 10-20 weight percent BaO.

5. The exhaust aftertreatment system of claim 1 wherein the lanthanum-based perovskite oxide particles comprise at least one of $LaCoO_3$, $La_{0.9}Sr_{0.1}CoO_3$, $LaMnO_3$, $La_{0.9}Sr_{0.1}MnO_3$, $LaFeO_3$, and $La_{0.9}Sr_{0.1}FeO_3$.

6. The exhaust aftertreatment system of claim 2 wherein the selective reduction catalyst comprises at least one of a base metal ion-substituted zeolite and a base metal ion-substituted silicoaluminophosphate.

7. The exhaust aftertreatment system of claim 6 wherein the base metal ion is of copper or iron.

8. The exhaust aftertreatment system of claim 1 wherein the first support body comprises extruded ceramic.

9. The exhaust aftertreatment system of claim 1 wherein the $NO_X$ reduction catalyst materials are deposited on the walls of the flow-through channels of the first support body as a first washcoat layer and a second washcoat layer.

10. The exhaust aftertreatment system of claim 9 wherein the first washcoat layer comprises an intimate mixture of the lanthanum-based perovskite oxide particles and the barium oxide particles, and the second washcoat layer comprises the $CuO/CeO_2$ particles.

11. The exhaust aftertreatment system of claim 9 wherein the first washcoat layer is dispersed on the channel walls from the inlet face to the outlet face of the flow-through support body, and, thereafter, the second washcoat layer is dispersed on the channel walls.

12. The exhaust aftertreatment system of claim 9 wherein the first washcoat layer is dispersed on a first portion of the channel walls near the inlet face of the flow-through support body, and the second washcoat layer is dispersed on a second portion of the channel walls near the outlet face of the support body.

13. A method of converting nitrogen oxides ($NO_X$), comprising nitrogen oxide (NO) and nitrogen dioxide ($NO_2$), to nitrogen ($N_2$) in an exhaust aftertreatment system of a lean/rich cycling engine that is controlled to cyclically operate in a fuel-lean mode and a fuel-rich mode, the exhaust aftertreatment system being free of platinum group metal elements and the method comprising:
passing an exhaust flow from the engine through a first flow-through reactor that is free of platinum group metal elements and is close-coupled to the engine so that the exhaust flow contacts:

lanthanum-based perovskite oxide particles to oxidize NO to $NO_2$ in the exhaust flow when the engine is operated in the fuel-lean mode, barium oxide (BaO) particles deposited on particles of mixed oxides of cerium and zirconium ($BaO/CeO_2$—$ZrO_2$) and present to remove $NO_X$ from the exhaust flow by temporarily storing the $NO_X$ at $NO_X$ storage sites when the engine is operated in the fuel-lean mode and to release $NO_X$ from the $NO_X$ storage sites to the exhaust flow when the engine is operated in the fuel-rich mode, and copper oxide (CuO) nanoparticles deposited on particles of cerium oxide ($CeO_2$) to reduce $NO_X$ to $N_2$ and generate ammonia ($NH_3$) in the exhaust flow when the engine is operated in the fuel-rich mode; and controlling the cyclical operation of the engine so that the engine operates in the fuel-lean mode for a first duration and the engine operates in the fuel-rich mode for a second duration, the first duration being longer than the second duration.

14. The method of claim 13 further comprising:

passing the exhaust flow from the engine through a second flow-through reactor located downstream of the first reactor in the exhaust aftertreatment system relative to a direction of the exhaust flow so that the exhaust flow contacts particles of a selective reduction catalyst, the selective reduction catalyst being capable of removing $NH_3$ from the exhaust flow by temporarily storing the $NH_3$ at $NH_3$ storages sites when the engine is operated in the fuel-rich mode, releasing $NH_3$ from the $NH_3$ storages sites to the exhaust flow when the engine is operated in the fuel-lean mode, and reducing breakthrough $NO_X$ from the first reactor to $N_2$ using $NH_3$ in the presence of oxygen ($O_2$).

15. The method of claim 13, wherein the fuel-rich mode of engine operation is initiated when a predetermined amount of $NO_X$ has accumulated at the $NO_X$ storage sites of the BaO particles so that the $NO_X$ storage sites are regenerated.

16. The method of claim 14, wherein the fuel-lean mode of engine operation is initiated when a predetermined amount of $NH_3$ has accumulated at the $NH_3$ storage sites of the selective reduction catalyst to regenerate the $NH_3$ storage sites.

17. The method of claim 14, wherein the first duration of fuel-lean mode and the second duration of fuel-rich mode are controlled so that the molar ratio of $NH_3$ to $NO_X$ in the exhaust flow over the selective reduction catalyst is about 1:1.

* * * * *